Figure 1:
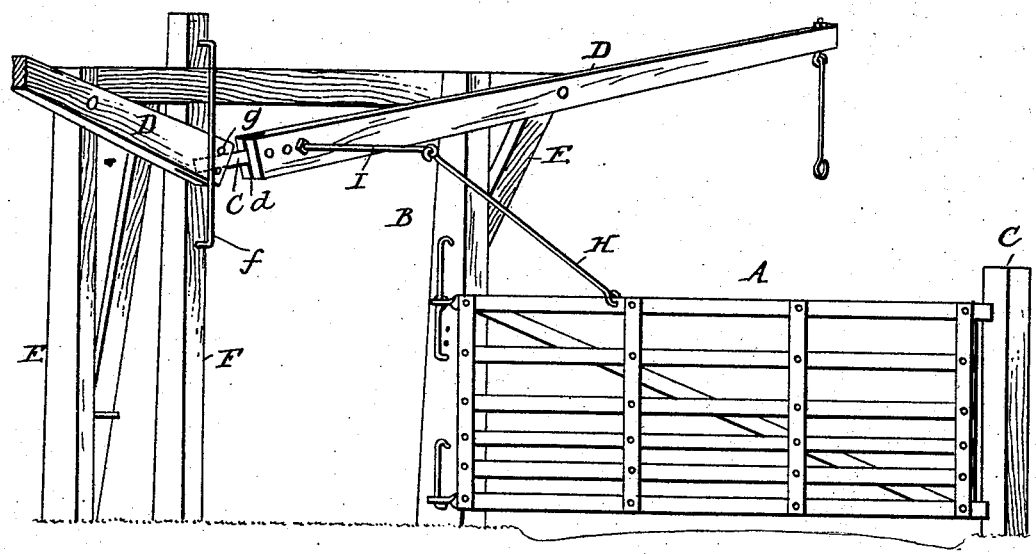

(No Model.)

W. R. WHITE.
GATE.

No. 577,092.

2 Sheets—Sheet 1.

Patented Feb. 16, 1897.

Witnesses
J. G. Hinkel

Inventor
W. R. White
Attorneys

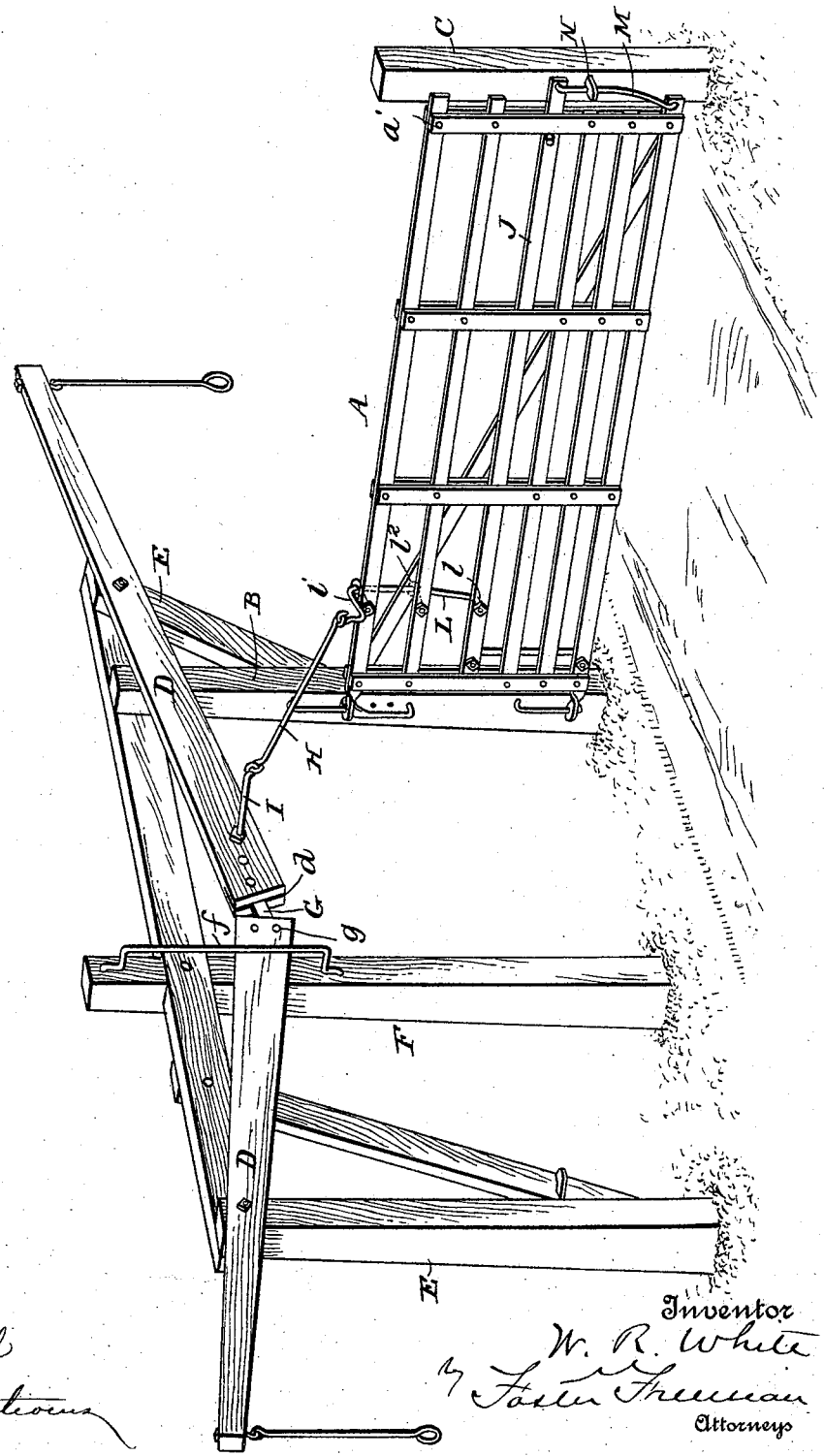

UNITED STATES PATENT OFFICE.

WILLIAM RICHARD WHITE, OF BLOOMINGTON, ILLINOIS.

GATE.

SPECIFICATION forming part of Letters Patent No. 577,092, dated February 16, 1897.

Application filed May 6, 1896. Serial No. 590,469. (No model.)

*To all whom it may concern:*

Be it known that I, WILLIAM RICHARD WHITE, a citizen of the United States, residing at Bloomington, in the county of McLean and State of Illinois, have invented certain new and useful Improvements in Gates, of which the following is a specification.

My invention relates to swinging gates of the general type illustrated in my Patents Nos. 461,061 and 493,539, dated, respectively, October 13, 1891, and March 14, 1893, and has for its object to improve such gates and their operating and controlling mechanisms.

In the drawings I have illustrated several forms or embodiments of my present invention, but I do not wish to be understood as thereby limiting the invention to the precise forms shown, as there may be other forms of the invention without departing from its principles.

Figure 2:
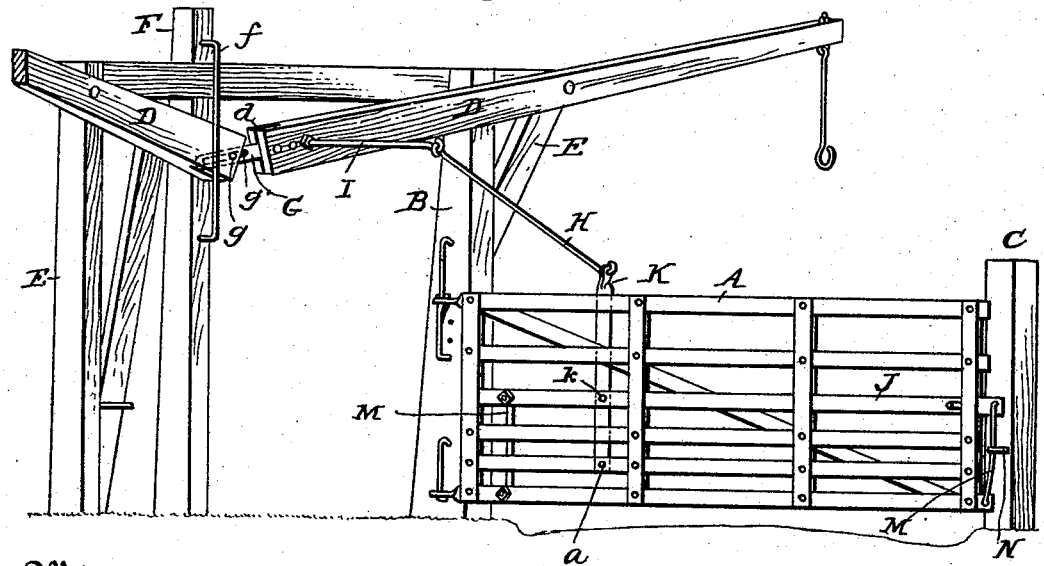

In such drawings, Figure 1 is a perspective view of a gate embodying the invention in a simple form. Fig. 2 is a similar view showing the invention applied to a gate provided with a sliding latch-bar, and Fig. 3 is a perspective view showing the preferred form of my invention.

In the drawings, A represents the gate, which is hinged to a post B and is arranged to swing to and from the post C, situated across the roadway from the hinge-post.

D D represent the operating-levers by which the gate is opened and closed, situated at one side of the roadway and extending to opposite sides of the gate. These levers are fulcrumed to posts E and are steadied at their inner or contiguous ends by a guide-rod $f$, carried by a post F. The parts thus far described may be of any usual or preferred construction. The inner ends of the operating-levers are connected so that they move together, whether one or the other be worked. When the levers are mounted upon fixed pivots or fulcrums, their inner ends must approach and recede from each other as they are operated to swing the gate, and I have invented a connection which permits these movements and which is in many respects advantageous. It consists of a plate or bar G, rigidly secured to and projecting beyond the end of one of the levers and having a longitudinal sliding connection with the other lever. This plate may be slotted, as at $g'$ in Fig. 2, and a pin $g$ be extended through the slot, or there may be two pins $g$, as in Fig. 1, one on either edge of the bar or plate. When the operating-levers are of wood, their inner ends may have kerfs $d$ cut in them and the plate G may be arranged therein, such arrangement being less conspicuous than one in which the bar and pins are arranged at the sides of the levers.

In the forms of swinging gates heretofore patented by me and of the style or class to which my present invention belongs the gates were provided with laterally-projecting frames or arms, to which the connecting-bars from the operating-levers were attached. For various reasons it has been found to be desirable to dispense with such laterally-projecting frames or bars as a part of the gate, and this I accomplish by my present invention.

H is the connecting rod or bar between the operating-levers and the gate. Its lower end may be connected directly to the gate, as shown in Fig. 1, but its upper end instead of being connected directly to one of the operating-levers, as heretofore, is connected to an arm I, which projects from one of the operating-levers toward the roadway a sufficient distance beyond the hinge-line of the gate to insure that when the gate is closed the connecting-rod H will be so inclined that a downward pull upon either lever will open the gate, and when the gate is open the connecting-rod will be so inclined that a downward pull on either lever will operate to close the gate. The length of this arm I will be determined largely by the point at which the rod H is connected with the gate; but it should be such that substantially the same amount of vertical vibration of the operating-lever is required, whether the gate be opened or closed.

In Figs. 2 and 3 the gate is shown as having one of its rails or bars so constructed and mounted as to form a latch-bar J. This latch-bar may be operated by the levers D and connecting-bar H. Thus in Fig. 2 is shown a lever K, arranged substantially in the vertical plane of the gate and fulcrumed at its lower end in one of the bars or rails $a$ thereof. At its upper end it is connected with the rod H, and intermediate of its ends it has a connection $k$ with the latch-bar. When the outer end of an operating-lever is depressed, it operates first to slide the latch-bar and release the gate and then to swing the gate. These operations are performed whether the gate be opened or closed.

There is one objection to the constructions just described and shown in Figs. 1 and 2, however, arising from the fact that the arm I must project so far toward the roadway, in order to have the gate operated properly in both directions, as to sometimes catch upon the tops of vehicles or loads of hay which may pass through the gate unless care be taken to avoid this. I have overcome this objection by the construction shown in Fig. 3, in which the length of the arm H is reduced and the latch-bar-operating lever is cranked, having the end to which the connecting-bar is joined extended a short distance beyond the plane of the gate on the side toward the connected ends of the operating-levers when the gate is closed. This lever is represented by L, and is connected by a short arm or crank $l$ at its lower end with the latch-bar and at its upper end by a longer crank or arm $l'$ with the connecting rod or bar H. The lever L is mounted in bearings $l^2$, in which it is free to turn. A downward pull upon either lever rocks the lever in its bearings and slides the latch-bar to release the gate, when a further pull swings the gate. This is the construction which I prefer, as it is exceedingly simple and easily constructed and applied to gates already set up.

I prefer that the latch bar or rail J should be supported by swinging links or levers M, one at each end being ordinarily sufficient. The link at the outer end of the gate is preferably arranged beyond the end upright piece $a'$, so that it may serve to engage with the gate-catches N, arranged upon suitable supports, to hold the gate respectively in its open and its closed positions. The link M is sufficiently long to engage with the catches whether the gate be elevated, as when raised to swing over snow, or in its normal position.

The several improvements which constitute this invention need not be all used in the same structure, as will be apparent. Thus the connecting means between the inner ends of the operating-levers might be replaced by some other form of connection which would be used in combination with the operating mechanism between the levers and the gate herein shown, the several features of invention being interchanged with other devices for performing similar offices.

What I claim is—

1. The combination with the gate, of the operating-levers, the inner ends of which come close together, the end portions of such levers having kerfs formed in them, a plate rigidly secured in the kerf of one of the levers and extending into the kerf in the other, and a pin with which the said plate has a sliding engagement, substantially as described.

2. The combination with a swinging gate, of the operating-levers, an arm extending laterally from one of the levers toward the roadway beyond the hinge-line, and a connecting-rod between such arm and the gate, substantially as described.

3. The combination with a swinging gate having a latch-bar, of the operating-levers, an arm projecting laterally from one of the levers beyond the hinge-line of the gate, and a connecting-rod connected to the said arm, and with the latch-bar of the gate, substantially as described.

4. The combination with a swinging gate having a latch-bar, of the operating-levers, an arm projecting laterally from one of the levers, a lever upon the gate connected with the latch-bar, and a connecting-rod between such lever and the laterally-projecting arm, substantially as described.

5. The combination with a swinging gate, of the operating-levers, a laterally-projecting arm carried by one of the levers and extending on the side toward the gate, when closed, beyond the hinge-line, a lever L connected with the latch-bar, and having an arm $l'$ extending a short distance beyond the plane of the gate, and a connecting-rod between the said laterally-projecting arm and the arm $l'$, substantially as described.

6. The combination with a gate, of a sliding latch-bar, the links M by which the latch-bar is carried, one of the links being arranged at the outer end of the gate, and the catches with which the said link engages to lock the gate, substantially as described.

7. The combination with the gate, of the operating-levers, the inner ends of which come close together, the end portion of one lever having a kerf therein, an extension of the other lever entering said kerf, and a pin with which the extension has a sliding engagement, substantially as described.

In testimony whereof I have signed my name to this specification in the presence of two subscribing witnesses.

WILLIAM RICHARD WHITE.

Witnesses:
JUDSON PEASLEY,
J. B. RUSSELL.